United States Patent
Flender et al.

(10) Patent No.: US 10,465,786 B2
(45) Date of Patent: Nov. 5, 2019

(54) ADJUSTABLE CAMSHAFT

(71) Applicant: Mahle International GmbH, Stuttgart (DE)

(72) Inventors: Thomas Flender, Eberdingen (DE); Juergen Rommel, Burgstetten (DE); Stefan Steichele, Gerlingen (DE); Michael Kreisig, Gerlingen (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 15/367,153

(22) Filed: Dec. 1, 2016

(65) Prior Publication Data
US 2017/0159791 A1    Jun. 8, 2017

(30) Foreign Application Priority Data

Dec. 2, 2015    (DE) .................. 10 2015 224 011

(51) Int. Cl.
*F01L 1/047* (2006.01)
*F16H 53/04* (2006.01)
*F01L 1/344* (2006.01)

(52) U.S. Cl.
CPC ............. *F16H 53/04* (2013.01); *F01L 1/047* (2013.01); *F01L 1/34413* (2013.01); *F01L 2001/0473* (2013.01); *F01L 2001/0476* (2013.01)

(58) Field of Classification Search
CPC combination set(s) only.
See application file for complete search history.

(56) References Cited

U.S. PATENT DOCUMENTS

| 5,235,939 A * | 8/1993 | Levin ............... F01L 1/047 123/90.15 |
| 2006/0060159 A1 | 3/2006 | Moretz et al. |
| 2007/0039411 A1* | 2/2007 | Lechner ............ F01L 1/047 74/567 |
| 2011/0094464 A1* | 4/2011 | Eimert ............. F01L 1/3442 123/90.15 |
| 2015/0167506 A1 | 6/2015 | Kim |
| 2017/0159506 A1* | 6/2017 | Kreisig ............. F01L 1/047 |
| 2017/0159513 A1* | 6/2017 | Rommel ............ F01L 1/047 |

FOREIGN PATENT DOCUMENTS

| DE | 102013007741 A * | 11/2014 | ........ F01L 13/0036 |
| DE | 102014116774 A1 | 6/2015 | |
| DE | 102014213937 A1 | 1/2016 | |

OTHER PUBLICATIONS

Machine translation of DE 10 2013 007 741, obtained Nov. 15, 2017.*
Machine translation of DE 10 2014 116 774, obtained Nov. 15, 2017.*
English abstract for DE-102014213937.
European Search Report for EP 161984612 dated Mar. 27, 2017.

* cited by examiner

*Primary Examiner* — Richard W Ridley
*Assistant Examiner* — Brian J McGovern
(74) *Attorney, Agent, or Firm* — Fishman Stewart PLLC

(57) ABSTRACT

An adjustable camshaft may have an inner shaft and an outer shaft arranged coaxially thereto, the outer shaft having a recess, and the inner shaft having a recess open towards the outer shaft. The camshaft may also include a first cam connected to the inner shaft in a torque-proof manner, and a second cam connected to the outer shaft in a torque-proof manner. The camshaft may further include at least one axial bearing element fixed in the recess of the outer shaft and that engages in the recess of the inner shaft.

2 Claims, 1 Drawing Sheet

US 10,465,786 B2

ADJUSTABLE CAMSHAFT

CROSS-REFERENCE TO RELATED APPLICATIONS

This application claims priority to German Patent Application No. DE 10 2015 224 011.8, filed on Dec. 2, 2015, the contents of which are hereby incorporated by reference in its entirety.

TECHNICAL FIELD

The present invention relates to an adjustable camshaft with an inner shaft and an outer shaft arranged coaxially thereto. The invention also relates to an internal combustion engine fitted with such a camshaft.

BACKGROUND

Adjustable camshafts are sufficiently known and are used to influence valve control times. The valve control times are thereby influenced by a twisting of an inner shaft relative to an outer shaft, wherein first cams are connected to the inner shaft in a torque-proof manner and second cams are connected to the outer shaft. The valve opening times or valve closure times can be shortened or lengthened by the mutual adjustment of the first and second cams. Usually a so-called phase shifter is used for twisting the inner shaft relative to the outer shaft, the rotor of which is connected in a torque-proof manner to the inner shaft and the stator of which is connected in a torque-proof manner to the outer shaft. An axial mounting of such an adjustable camshaft is usually accomplished in his case by means of an axially fixed connection of the inner shaft to the rotor, wherein in turn the rotor of the phase shifter is mounted axially with respect to the stator of the same so that in the case of an axially fixed connection of the stator to the outer shaft, this is mounted axially against the inner shaft via the phase shifter. However, the axial mounting of the camshaft via the phase shifter requires a low-tolerance and therefore high-precision connection both of the inner shaft to the rotor of the phase shifter and also of the outer shaft to the stator of the same. Overall this therefore requires a comparatively high manufacturing precision and therefore comparatively high costs.

SUMMARY

The present invention is therefore concerned with the problem of providing an improved or at least an alternative embodiment for an adjustable camshaft of the generic type, which is characterized in particular by an alternative and more cost-effective axial mounting of the camshaft.

The present invention is based on the general idea of bringing about an axial mounting of an adjustable camshaft for the first time not via a separate axial mounting of an inner shaft on a rotor and an outer shaft on a stator of a phase shifter but of mounting the inner shaft axially directly on the outer shaft and thereby opening up the possibility of being able to mount only the outer shaft on the stator of the phase shifter or the inner shaft on the rotor of the phase shifter or however of being able to mount the outer shaft at a separate location in a bearing frame or a cylinder head cover and thereby being able to achieve an overall floating mounting in relation to the phase shifter. However, the two first-mentioned alternatives also already offer the possibility of compensating for higher manufacturing tolerances since it is not necessary to fix both the inner shaft and also the outer shaft with the phase shifter in the axial direction, as was hitherto required, but only one of these two shafts as desired, or even none. The adjustable camshaft according to the invention in this case comprises in a known manner an inner shaft and an outer shaft arranged coaxially thereto, as well as a first cam which is connected in a torque-proof manner to the inner shaft and a second cam which is connected in a torque-proof manner to the outer shaft. According to the invention, for the axial mounting of the adjustable camshaft on the inner shaft there is now provided a recess which is open towards the outer shaft, for example, a groove extending at least in the manner of a circular segment over an angular region, in particular an annular groove, in which at least one axial bearing element engages, which is at the same time fixed in a recess of the outer shaft. The recess can thereby accordingly guide the pin or the axial bearing element partially in the effective range of the angle of rotation. In this case, an at least partially circumferential groove is the most obvious from the manufacturing viewpoint. As a result of the direct axial mounting of the inner shaft on the outer shaft, the adjustable camshaft according to the invention can be mounted overall in the axial direction, by mounting this for example merely via the inner shaft or the outer shaft on the phase shifter. In particular as a result it is also possible to mount the stator of the phase shifter (or the rotor) in the axial direction in a floating manner with respect to the rotor (or to the stator) of the phase shifter. Since phase shifters usually have a small axial and radial play, they are sensitive with respect to possible jamming during connection of the camshaft in relation to production-related concentricity and angular offset errors. The tendency to jamming can be positively influenced by the floating mounting.

In an advantageous further development of the solution according to the invention, the axial bearing element is configured as an axial bearing pin which is inserted through a recess configured as a through-opening in the outer shaft and engages in the recess of the inner shaft. Naturally two opposite axial pins can also be provided here which pass through the outer shaft in appurtenant through-openings and engage in the recess (groove/annular groove) of the inner shaft. The major advantage of such an axial mounting of the inner shaft relative to the outer shaft consists in the comparatively simple manufacture of the axial mounting and in the possibility of being able to undo the axial mounting again by removing the at least one axial bearing pin and for example, remove the inner shaft from the outer shaft. Purely theoretically the recess can be configured completely circumferentially on the inner shaft although it is naturally also feasible that this is only formed over a respective circumferential region, for example slightly larger than the angular adjustment region of the inner shaft to the outer shaft. Particularly the last-mentioned variant offers the major advantage of a smaller cross-sectional weakening of the inner shaft.

In a further advantageous embodiment of the solution according to the invention, an additional annular groove open towards the recess of the inner shaft configured as an annular groove is provided in the axial shaft, wherein the at least one axial bearing element is configured as a circlip which in the mounted state engages both in the annular groove of the inner shaft and in the additional annular groove of the outer shaft. For mounting the inner shaft in the outer shaft, the circlip is initially compressed and thus reduced in size with regard to its diameter so that in the state arranged in the outwardly open annular groove of the inner shaft, it can be inserted together with the inner shaft into the outer shaft. If the circlip reaches the additional annular groove provided in the outer shaft, it thus springs apart and thereby engages in the annular groove of the outer shaft. As a result of the bilateral engagement of the axial bearing element configured as a circlip both in the annular groove of the inner shaft and also in the annular groove of the outer shaft, a comparatively easy to mount but nevertheless extremely reliable axial mounting of the inner shaft relative to the outer shaft can be achieved. Such a camshaft is usually dismounted by withdrawing the inner shaft from the outer shaft during which the circlip is destroyed, although it is alternatively also feasible that in the region of the inwardly open additional annular groove in the outer shaft, through-openings are provided which allow the insertion of a tool and thus compression of the circlip for dismounting. These through-openings are naturally only open for dismounting of the circlip whilst during operation of the camshaft however they are closed to be able to effectively prevent any oil leakage.

In a further advantageous embodiment of the solution according to the invention, at least one second cam is fixed on the outer shaft by a thermal joining fit, by welding, by soldering, by adhesive bonding or by a press fit. This non-definitive list already suggests what varied possibilities exist for fixing the at least one second cam on the outer shaft, where in particular the production of a thermal joining fit is used in many cases. For this purpose the at least one second cam is heated and/or the outer shaft is cooled. As a result of a temperature compensation, a radial pressing of the two components with one another is achieved and by this means the at least one second cam is fixed on the outer shaft.

Further important features and advantages of the invention are obtained from the subclaims, from the drawings and from the relevant description of the figures by reference to the drawings.

It is understood that the features mentioned hereinbefore and still to be explained hereinafter can be used not only in the respectively specified combination but also in other combinations or alone without departing from the scope of the present invention.

Preferred exemplary embodiments of the invention are presented in the drawings and are explained in detail in the following description, where the same reference numbers refer to the same or similar or functionally the same components.

BRIEF DESCRIPTION OF THE DRAWINGS

In the figures, in each case schematically.

DETAILED DESCRIPTION

Figure 1:
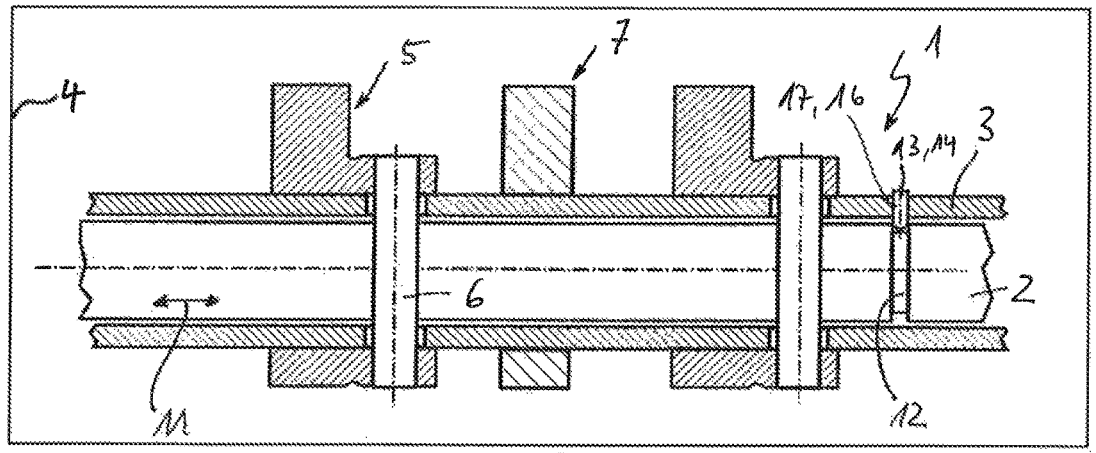
FIG. 1 shows a sectional view through an adjustable camshaft according to the invention with an axial bearing element configured as an axial bearing pin.
Figure 2:
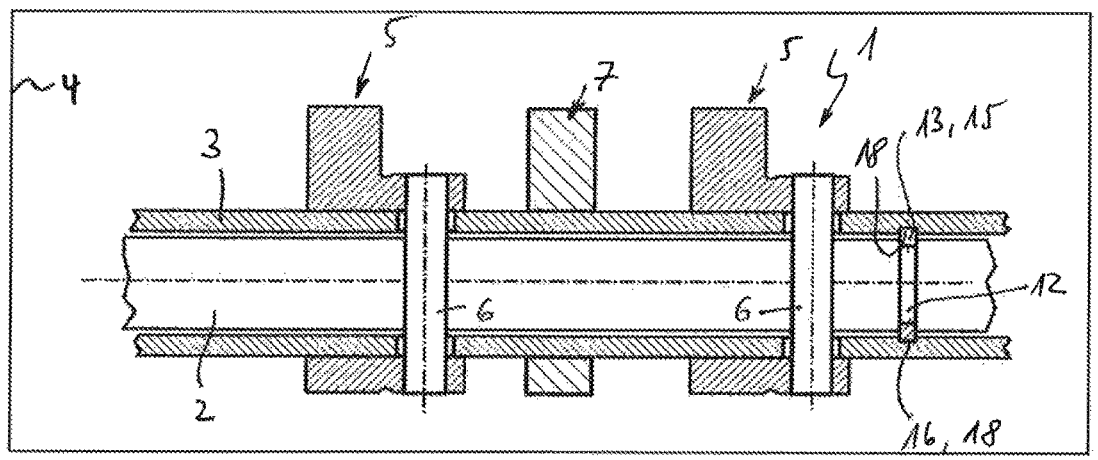
FIG. 2 shows a view as in FIG. 1 but with an axial bearing element configured as a circlip.
Figure 3:
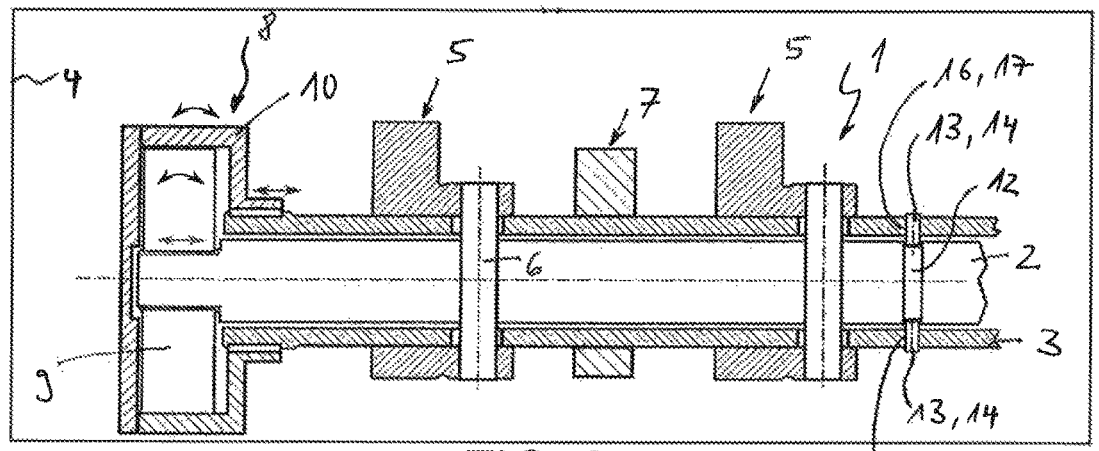
FIG. 3 shows a view as in FIG. 1 but additionally with an additional axial bearing element configured as an axial bearing pin and a phase shifter.

According to FIGS. 1 to 3, an adjustable camshaft 1 according to the invention comprises an inner shaft 2 and an outer shaft 3 arranged coaxially thereto. Such an adjustable camshaft 1 can, for example, be arranged in an internal combustion engine, in particular in a motor vehicle. Furthermore provided in a known manner are at least one first cam 5 which is connected via a corresponding pin 6 in a torque-proof manner to the inner shaft 2 and at least one second cam 7 which is connected in a torque-proof manner to the outer shaft 3. As a result of a twisting of the inner shaft 2 relative to the outer shaft 3, the first cam 5 is therefore twisted relative to the second cam 7 since the first cam 5 is mounted in a torque-proof manner with the inner shaft 2 but rotatably about the outer shaft 3. A relative twisting of the inner shaft 2 relative to the outer shaft 3 is accomplished in this case via a phase shifter 8 (cf. FIG. 3) whose rotor 9 is connected in a torque-proof manner to the inner shaft 2 and whose stator 10 is connected in a torque-proof manner to the outer shaft 3.

Hitherto an axial mounting of the camshaft 1 has usually been achieved by means of an axial fixing of the inner shaft 2 on the rotor 9 of the phase shifter 8 and an axial fixing of the outer shaft 3 on the stator 10 of the phase shifter 8. This however requires a comparatively high manufacturing precision and as a result comparatively high production costs. The camshaft 1 according to the invention should now make it possible for the first time to mount the inner shaft 2 directly in the axial direction 11 fixedly on the outer shaft 3 and as a result mount the entire camshaft 1, for example in a floating manner with respect to the phase shifter 8, but at least either the inner shaft 2 in a floating manner with respect to the rotor 9 or the outer shaft 3 in a floating manner, that is displaceably in the axial direction to the stator 10 of the phase shifter 8.

According to the invention, therefore a preferably circumferential recess 12 which is open towards the outer shaft 3, for example, an annular groove is provided on the inner shaft 2, likewise at least one axial bearing element 13 which, for example, according to FIGS. 1 and 3 can be configured as an axial bearing pin 14 and according to FIG. 2 as a circlip 15 and which on the one hand is fixed in a recess 16 of the outer shaft 3 and on the other hand engages in the recess 12 of the inner shaft 2 configured as an annular groove.

If the embodiments of the adjustable camshaft 1 according to the invention according to FIGS. 1 and 2 are observed, it can be seen that here the axial bearing element 13 is configured as an axial bearing pin 14 and the recess 16 is configured as a through-opening 17 so that the axial bearing pin 14 is inserted through the through-opening 17 of the outer shaft 3 and engages in the recess 12 of the inner shaft 2. Here either only a single axial bearing pin 14 can be provided (cf. FIG. 1) or for example, two opposite axial bearing pins 14 which are inserted in opposite through-openings 17 (recesses 16) of the outer shaft 3 and engage in the recess 12 of the inner shaft 2. The term "recess 16" should therefore be understood not only as a blind-hole-like recess but naturally also as a through-opening.

The camshaft 1 formed with the at least one axial bearing pin 14 thereby offers the major advantages that the camshaft 1 is both simple to mount and also, if necessary easy to dismount again. For this purpose the at least one axial bearing pin 14 only needs to be withdrawn from the appurtenant recess 16 or through opening 17.

If the embodiment of the camshaft 1 according to the invention depicted according to FIG. 2 is observed, it can be seen therein that the recess 16 in the outer shaft 3 is configured as an additional annular recess 18 open towards the recess 12 of the inner shaft 3, in which the axial bearing element 13 configured as circlip 15 engages. The circlip 15 therefore engages in the mounted state both in the recess 12 of the inner shaft 2 and in the annular groove 18 of the outer shaft 3. A mounting of this type of camshaft 1 according to the invention is accomplished by placement of the axial bearing element 13 configured as circlip 15 on the inner shaft 2 in the area of the recess 12 and a subsequent compression of the circlip 15 so that this can be inserted into the outer shaft 3 together with the inner shaft 2. If the circlip 15 thereby reaches the recess 16, that is the additional annular groove 18 in the outer shaft 3, it springs apart and thereby engages in the annular groove 18 and secures the inner shaft 2 relative to the outer shaft 3 in axial direction 11.

A fixing of the at least one second cam 7 on the outer shaft 3 can be accomplished here for example, by means of a thermal joining fit, by welding, by soldering, by adhesive bonding or however by a press fit, where the said fixing methods are not definitive and are selected according to the respective requirements.

With the camshaft 1 according to the invention, it is therefore possible for the first time to connect the stator 10 of the phase shifter 8 axially fixedly to the outer shaft 3 but the rotor 9 axially movably to the inner shaft 2 or alternatively to connect the stator 10 axially movably to the outer shaft 3 and the rotor 9 axially fixedly to the inner shaft 2. Alternatively again it is also feasible to connect both the stator 10 axially movably to the outer shaft 3 and also the rotor 9 axially movably to the inner shaft 2 and thus bring about a completely floating mounting of the camshaft 1 relative to the phase shifter 8. In this case, the camshaft 1 according to the invention must be mounted axially in another manner, for example in a cylinder head cover. Unlike the axial bearing methods known from the prior art, the camshaft 1 according to the invention however makes it possible to compensate for larger manufacturing tolerances with the result that the manufacturing accuracy and therefore also the manufacturing costs can be reduced.

The invention claimed is:

1. An adjustable camshaft comprising:
   an inner shaft and an outer shaft arranged coaxially thereto, the outer shaft having a recess, and the inner shaft having a recess open towards the outer shaft;
   a first cam connected to the inner shaft in a torque-proof manner;
   a second cam connected to the outer shaft in a torque-proof manner;
   at least one axial bearing element fixed in the recess of the outer shaft and that engages in the recess of the inner shaft; and
   a phase shifter having a rotor and a stator, the stator being connected to the outer shaft, and the rotor being connected to the inner shaft;
   wherein the recess of the outer shaft is configured as an annular groove partially extending radially in the outer shaft and open towards the recess of the inner shaft; and
   wherein the at least one axial bearing element is configured as a circlip, which in a mounted state engages in the recess of the inner shaft and the annular groove of the outer shaft at least one through-opening disposed in the outer shaft extending from the annular groove.

2. The camshaft according to claim 1, wherein at least the second cam is fixed on the outer shaft by one of a thermal joining fit, welding, soldering, adhesive bonding, or a press fit.

* * * * *